United States Patent [19]
Mawatari et al.

[11] Patent Number: 5,614,568
[45] Date of Patent: Mar. 25, 1997

[54] ANTIBACTERIAL RESIN COMPOSITION

[75] Inventors: Masaaki Mawatari; Chie Hamazaki, both of Suzuka; Tateki Furuyama, Yokkaichi, all of Japan

[73] Assignee: Japan Synthetic Rubber Co., Ltd., Tokyo, Japan

[21] Appl. No.: 446,304

[22] Filed: May 22, 1995

Related U.S. Application Data

[63] Continuation of Ser. No. 171,151, Dec. 22, 1993, abandoned.

[30] Foreign Application Priority Data

Dec. 25, 1992 [JP] Japan .................................. 4-358363

[51] Int. Cl.$^6$ .............................. C08K 3/10; C08K 3/08; C08K 3/22; C08K 3/32
[52] U.S. Cl. .......................... 523/122; 523/310; 524/403; 524/407; 524/408; 524/413; 524/414; 524/415; 524/417; 524/424; 524/430; 524/431; 524/432; 524/433; 524/434; 524/435; 524/436; 524/440
[58] Field of Search .................................. 523/122, 216, 523/310; 524/279, 443, 504, 577, 403, 407, 408, 413, 414, 415, 417, 424, 430, 431, 432, 433, 434, 435, 436, 440

[56] References Cited

U.S. PATENT DOCUMENTS 4,254,028  3/1981  Ono et al. ................................. 524/577
5,229,446  7/1993  Sakamoto et al. ....................... 524/322

FOREIGN PATENT DOCUMENTS 0288063  10/1988  European Pat. Off. .
0444939   9/1991  European Pat. Off. .
3-181538  8/1991  Japan .

OTHER PUBLICATIONS

Database WPI, Derwent Publications, AN 89–119524, JP-A-01 066 254, Mar. 13, 1989.

Database WPI, Derwent Publications Ltd., AN 91–146218, JP-A-3 084 066, Apr. 9, 1991.

Database WPI, Derwent Publications Ltd., AN 94–023024, JP-A-5 331 345, Dec. 14, 1993.

*Primary Examiner*—Ana Woodwward
*Attorney, Agent, or Firm*—Oblon, Spivak, McClelland, Maier & Neustadt, P.C.

[57] ABSTRACT

An antibacterial resin composition comprising (A) 100 parts by weight of a styrene resin, (B) 0.01 to 30 parts by weight of an antibacterial agent and (C) 0.01 to 30 parts by weight of a compound having a specific functional group, and said antibacterial resin composition is excellent in antibacterial property and surface appearance of molded article and can give a molded article which can be applied to many fields.

24 Claims, No Drawings

ANTIBACTERIAL RESIN COMPOSITION

This application is a Continuation of application Ser. No. 08/171,151, filed on Dec. 22, 1993, now abandoned.

BACKGROUND OF THE INVENTION

This invention relates to an antibacterial resin composition comprising mainly a styrene resin excellent in antibacterial property and surface appearance of molded article.

Since styrene resins such as ABS resin and the like are excellent in surface appearance of molded article, processability on molding equipment, physical properties and mechanical properties, they have been used in many fields such as electrical and electronic fields; fields of office automation and appliances; automobile field; sanitary field, for example, lavatory seat, kitchenware and bathroom fittings; sundry goods; etc.

Recently, the breeding of bacteria in goods used in these fields, for example, in the interior of air-conditioner becomes a problem because it adversely affects human body. Styrene resins are often used in goods in which bacteria tend to grow, and hence, it has been desired to impart antibacterial and fungicidal properties to the styrene resins. In order to impart antibacterial and fungicidal properties to styrene resins, a method by which commercially available antibacterial and fungicidal agents are incorporated into the styrene resins has been used; however, satisfactory antibacterial property has not been imparted to the styrene resins by the method.

SUMMARY OF THE INVENTION

This invention aims at solving the above problems of prior art and providing an antibacterial resin composition which is excellent in antibacterial property and surface appearance of molded article and can be used in many fields.

According to this invention, there is provided an antibacterial resin composition comprising:

(A) 100 parts by weight a styrene resin, (B) 0.01 to 30 parts by weight of an antibacterial agent, and (C) 0.01 to 30 parts by weight of a compound or polymer having at least one functional group and a molecular weight of 300 to 10,000.

According to this invention, there is further provided an antibacterial resin composition comprising:

(A) 100 parts by weight of a styrene resin, (B) 0.01 to 30 parts by weight of an antibacterial agent, and (F) 0.01 to 30 parts by weight of a mixture of:
  (C) a compound or polymer having at least one functional group and a molecular weight of 300 to 10,000 and
  (D) an antistatic agent in a weight ratio of (C)/(D) of 10/90 to 90/10.

According to this invention, there is still further provided an antibacterial resin composition comprising 100 parts by weight of a mixture of:

(A) 10 to 99.9% by weight of a styrene resin and (E) 90 to 0.1% by weight of a polyamide elastomer and/or a polyester elastomer;

(B) 0.01 to 30 parts by weight of an antibacterial agent; and (F) 0.01 to 30 parts by weight of a mixture of:

(C) a compound or polymer having at least one functional group and a molecular weight of 300 to 10,000 and (D) an antistatic agent in a weight ratio of (C)/(D) of 10/90 to 90/10.

DETAILED DESCRIPTION OF THE INVENTION

The styrene resin (A) of this invention may be 1) a polymer resin or graft polymer resin (rubber-modified aromatic alkenyl resin) obtained by polymerizing or graft-polymerizing (b) a monomeric component consisting of an aromatic alkenyl compound alone or in admixture with at least one other monomer copolymerizable therewith in the presence or absence of (a) a rubbery polymer, or (2) a blend type graft-copolymer resin obtained by blending a thermoplastic resin obtained by polymerizing said monomeric component (b) with said graft polymer resin, or (3) a mere blend of (a) a rubbery polymer with a thermoplastic resin composed of said monomeric component (b).

From the view point of impact resistance, the styrene resin (A) is preferably a rubber-reinforced resin composed of (a) 5 to 70% by weight of a rubbery polymer and (b) 95 to 30% by weight of a monomeric component consisting of an aromatic alkenyl compound alone or in admixture with at least one other monomer copolymerizable therewith, provided that (a)+(b)=100% by weight.

The rubbery polymer (a) used in this invention includes, for example, polybutadiene, polyisoprene, styrene-butadiene copolymer (the styrene content is preferably 5 to 60% by weight), styrene-isoprene copolymer, acrylonitrile-butadiene copolymer, ethylene-α-olefin copolymer, ethylene-α-olefin-polyene copolymer, acrylic rubber, butadiene-(meth-)acrylate copolymer, polyisoprene, styrene-butadiene block copolymer, styrene-isoprene block copolymer, hydrogenated styrene-butadiene block copolymer, hydrogenated butadiene polymer, ethylenic ionomer and the like. The styrene-butadiene block copolymer and styrene-isoprene block copolymer include those having a structure of the AB type, ABA type, tapered type or radial teleblock type. The hydrogenated butadiene polymer includes hydrogenation products of the above-mentioned block copolymers, hydrogenation products of a block copolymer consisting of styrene polymer block and styrene-butadiene random copolymer block and hydrogenation products of a polymer consisting of a polybutadiene block having a 1,2-vinyl configuration content of not more than 20% by weight and a polybutadiene block having a 1,2-vinyl configuration content of more than 20% by weight. These rubbery polymers (a) may be used alone or in combination of two or more.

The content of the rubbery polymer (a) is preferably 5 to 70% by weight, more preferably 5 to 50% by weight, and most preferably 5 to 40% by weight, based on the weight of the component (A). When the content of the component (a) is less than 5% by weight, the impact resistance is inferior and when the content of the component (a) is more than 70% by weight, the stiffness is inferior.

The monomeric component (b) is an aromatic alkenyl compound alone or a mixture of an aromatic alkenyl compound and at least one other monomer copolymerizable therewith.

The aromatic alkenyl compound includes styrene, t-butylstyrene, α-methylstyrene, p-methylstyrene, divinylbenzene, 1,1-diphenylstyrene, N,N-diethyl-p-aminoethylstyrene, N,N-diethyl-p-aminomethylstyrene, vinylpyridine, vinylxylene, monochlorostyrene, dichlorostyrene, monobromostyrene, fluorostyrene, ethylstyrene, vinylnaphthalene and the like. In particular, styrene and α-methylstyrene are preferred. The above-mentioned aromatic alkenyl compounds may be used alone or in admixture of two or more.

Other monomers constituting the monomeric component (b) include alkenyl cyanide compounds such as acrylonitrile, methacrylonitrile and the like; acrylic acid esters such as methyl acrylate, ethyl acrylate, propyl acrylate, butyl acrylate, amyl acrylate, hexyl acrylate, octyl acrylate, 2-ethylhexyl acrylate, cyclohexyl acrylate, dodecyl acrylate, octadecyl acrylate, phenyl acrylate, benzyl acrylate and the like; methacrylic acid esters such as methyl methacrylate, ethyl methacrylate, propyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate, phenyl methacrylate, benzyl methacrylate and the like; unsaturated acid anhydrides such as maleic anhydride, itaconic anhydride, citraconic anhydride and the like; unsaturated monocarboxylic acids such as acrylic acid, methacrylic acid and the like; imide compounds of α- or β-unsaturated dicarboxylic acids such as maleimide, N-methylmaleimide, N-butylmaleimide, N-(p-methylphenyl)maleimide, N-phenylmaleimide, N-cyclohexylmaleimide and the like; epoxy compounds such as glycidyl methacrylate, allyl glycidyl ether and the like; unsaturated carboxylic acid amides such as acrylamide, methacrylamide and the like; amino group-containing unsaturated compounds such as acrylamine, aminomethyl methacrylate, aminoethyl methacrylate, aminopropyl methacrylate, aminostyrene and the like; hydroxyl group-containing unsaturated compounds such as 3-hydroxy-1-propane, 4-hydroxy-1-butene, cis-4-hydroxy-2-butene, trans-4-hydroxy-2-butene, 3-hydroxy-2-methyl-1-propene, 2-hydroxyethyl acrylate, 2-hydroxyethyl methacrylate and the like; oxazoline group-containing unsaturated compounds such as vinyloxazoline and the like; etc.

Preferable other monomers as the component (b) include acrylonitrile, methacrylic acid, methyl methacrylate, maleic anhydride, N-phenylmaleimide, glycidyl methacrylate, 2-hydroxyethyl methacrylate and the like, and particularly preferable are acrylonitrile, N-phenylmaleimide, 2-hydroxyethyl methacrylate and the like. These other monomers may be used alone or in combination of two or more.

The amount of the monomeric component (b) used is preferably 30 to 95% by weight, more preferably 50 to 95% by weight and most preferably 60 to 95% by weight, based on the weight of the component (A). When the amount of the component (b) used is less than 30% by weight, the stiffness is inferior and when it is more than 95% by weight, the impact resistance is inferior.

The intrinsic viscosity of the methyl ethyl ketone-soluble matter in the component (A) of this invention as measured in methyl ethyl ketone at 30° C. is preferably 0.2 to 2.0 dl/g. When this intrinsic viscosity is less than 0.2 dl/g the impact resistance is inferior and when it exceeds 2.0 dl/g the stiffness is inferior. The intrinsic viscosity may be adjusted by selecting a chain transfer agent, a polymerization time, a polymerization temperature or the like.

When the rubbery polymer (a) in the component (A) of this invention is polybutadiene rubber, styrene-butadiene rubber, acrylonitrile-butadiene rubber or the like, the component (A) is preferably a graft copolymer resin obtained by graft-polymerizing the monomer or monomers constituting the monomeric component (b) on the rubbery polymer by an emulsion polymerization, solution polymerization, bulk polymerization or the like, and when the rubbery polymer (a) in the component (A) is an ethylene-propylene rubber, ethylene-propylene-non-conjugated diene rubber, styrene-butadiene block copolymer or a hydrogenation product of a diene type rubbery polymer, the component (A) is preferably a graft copolymer resin obtained by graft-polymerizing the monomer or monomers constituting the monomeric component (b) on the rubbery polymer by a solution polymerization or bulk polymerization.

A mixture of a thermoplastic resin composed only of the monomeric component (b) with the above-mentioned graft copolymer resin may also be used as the component (A) of this invention, and this thermoplastic resin may be prepared by a well-known polymerization method, that is, an emulsion polymerization, suspension polymerization, solution polymerization or bulk polymerization.

After the polymerization, the resin obtained [the graft copolymer resin consisting of the component (A) or the thermoplastic resin consisting only of the monomeric component (b)] is subjected to recovery steps such as coagulation, washing, solvent removal and the like and then dried and formed into a powder or fluid.

In the production of the above graft copolymer and/or the copolymer of the component (b), the monomers constituting the said graft copolymer and/or said copolymer may be polymerized in the presence of a part or the whole of the antibacterial agent which is the component (B), whereby the antibacterial property and appearance of molded article of the resin composition of this invention can be much more improved. In this case, the component (C) and the remaining component (B), if any, may be mixed with the copolymer obtained by this polymerization. The amount of the component (B) which should be allowed to be present in the production of the component (A) is not critical; however, it is preferably 5 to 95% by weight, more preferably 10 to 90% by weight and most preferably 20 to 80% by weight, of the total amount of the component (B).

Incidentally, the grafting degree of the component (A) containing the rubber component is preferably 10 to 200% by weight, and when it is less than 10% by weight or more than 200% by weight, there is a tendency that the impact resistance becomes low.

The term "grafting degree" used herein means the proportion of the copolymer component directly graft-bonded to the rubbery polymer based on the rubber content of the graft copolymer resin. The grafting degree can be adjusted by appropriately selecting the amount of the polymerization initiator, the polymerization temperature or the like. The grafting degree can be specifically determined by pouring 2 g of the styrene resin of this invention into methyl ethyl ketone at room temperature, sufficiently stirring the resulting mixture and measuring the weight of the undissolved matter (w). On the other hand, the amount of the rubbery polymer in the undissolved matter (w) can be calculated based on the polymerization recipe. The weight of the rubbery polymer calculated is taken as R and the grafting degree is calculated from the following equation:

Grafting degree (weight %)=[(w–R)/R]×100.

The component (B) of this invention is an antibacterial agent, preferably an inorganic antibacterial agent. The inorganic antibacterial agent includes organic or inorganic metal compounds, metal compounds and/or metal complexes supported on substances having a porous structure (referred to hereinafter as the porous structure substance) and the porous structure substances which have been subjected to ion-exchange with metal ions.

The metal ions used include ions of silver, copper, zinc, magnesium, mercury, tin, lead, bismuth, cadmium, chromium, cobalt, nickel, iron, manganese, arsenic, antimony, barium and the like. Preferable are ions of silver, copper, zinc and magnesium, more preferable are ions of silver, copper and zinc, and most preferable are ions of silver and zinc.

The silver compound includes, for example, colloidal silver, silver carbonate, silver chlorate, silver perchlorate, silver bromate, silver iodate, silver periodate, silver phosphate, silver diphosphate, silver nitrate, silver nitrite, silver sulfate, silver tungstate, silver vanadate, silver thiocyanate, silver amidosulfate, silver borate, silver thiosulfate, silver oxide, silver peroxide, silver sulfide, silver fluoride, silver chloride, silver bromide, silver iodide, silver carboxylates (e.g. silver acetate, silver benzoate, silver lactate, silver citrate, silver behenate, silver stearate, and silver tartrate), silver pyrophosphate, silver diethylcarbamate, silver metasulfonate, silver trifluoroacetate, silver salts of alkyl, phenyl and alkylphenyl phosphates and phosphites, silver phosphofluoride, silver phthalocyanine, silver ethylenediaminetetraacetate, silver protein and the like. Among them, preferable are colloidal silver, silver chlorate, silver perchlorate, silver carbonate, silver bromate, silver iodate, silver periodate, silver phosphate, silver diphosphate, silver pyrophosphate, silver nitrate, silver sulfate, silver tungstate, silver vanadate, silver citrate, silver thiocyanate, silver carboxylates, silver amidosulfate, silver thiosulfate, silver chloride, silver oxide and silver peroxide. Particularly preferable are colloidal silver, silver oxide, silver phosphate, silver carbonate, silver iodate, silver pyrophosphate, silver citrate, silver tungstate and silver chloride.

The copper compound includes, for example, copper (II) nitrate, copper sulfate, copper perchlorate, copper acetate, potassium tetracyanocuprate, copper chloride and the like.

The zinc compound includes zinc (II) nitrate, zinc sulfate, zinc perchlorate, zinc thiocyanate, zinc acetate, zinc chloride, zinc oxide and the like.

These metals may be used alone or in combination of two or more.

Among them, colloidal silver is yellow or reddish brown, aqueous colloidal silver, has a great antibacterial activity and is little harmful to human body. Silver is preferred because it is excellent in heat resistance, good in corrosion resistance in the atmosphere and also excellent in durability.

Such a colloidal silver can be easily prepared by a silver salt-reducing method, for example, a method comprising adding dilute aqueous ammonia to an aqueous silver nitrate solution to prepare silver oxide, further adding aqueous ammonia thereto to form a complex, diluting it with water, thereafter adding an aqueous solution of oxalic acid or tannic acid and then heating the resulting mixture. The reducing method includes methods of reduction with hydrogen, carbon and carbon monoxide, reducing methods using alkali metals and other known reducing methods.

The colloidal silver has, preferably, a silver content of 0.02 to 1% by weight, a particle size of 50 mμ or less and a pH of 7.0±1.0, more preferably a silver content of 0.05 to 0.2% by weight and a particle size of 10 mμ or less. Incidentally, as to the antibacterial activity of silver, there is a tendency that the finer the particle size of colloidal silver, the higher the activity becomes.

The organic metal compounds mentioned above include, for example, metal salts of carboxylic acids, and the carboxylic acids include the following carboxylic acids:

(1) Aliphatic saturated monocarboxylic acids having 1 to 30 carbon atoms, preferably 2 to 22 carbon atoms, for example, acetic acid, propionic acid, butyric acid, valeric acid, lauric acid, myristic acid, palmitic acid, stearic acid and docosanoic acid.

(2) Aliphatic saturated dicarboxylic acids having 2 to 34 carbon atoms, preferably 2 to 8 carbon atoms, for example, oxalic acid, succinic acid, adipic acid, suberic acid and sebacic acid.

(3) Aliphatic unsaturated carboxylic acids having 3 to 34 carbon atoms, preferably 4 to 22 carbon atoms, for example, oleic acid, erucic acid, maleic acid and fumaric acid.

(4) Carbocyclic carboxylic acids, for example, benzoic acid, phthalic acid, cinnamic acid, hexahydrobenozic acid, abietic acid and hydrogenated abietic acid.

(5) Hydroxycarboxylic acids, for example, lactic acid, malic acid, tartaric acid, citric acid and salicylic acid.

(6) Aminocarboxylic acids, for example, aspartic acid and glutamic acid.

In this invention, preferable salts of carboxylic acids are silver salts of carboxylic acids, for example, silver salts of the aliphatic saturated monocarboxylic acids (1), particularly silver laurate and silver stearate; silver salts of the aliphatic unsaturated carboxylic acids (3), particularly silver oleate; and silver salts of the carbocyclic carboxylic acids (4), particularly silver benzoate and silver hydrogenated abietate.

The above-mentioned inorganic metal compounds include, for example, metal salts of alkyl, phenyl and alkylphenyl phosphates and phosphites, and examples of silver salts of the alkyl, phenyl and alkylphenyl phosphates and phosphites are as follows:

(1) Monosilver and disilver salts of mono-$C_{1-22}$alkyl phosphates.

(2) Monosilver and disilver salts of mono-$C_{1-22}$alkyl phosphites.

(3) Monosilver salts of di-$C_{1-22}$alkyl phosphates.

(4) Monosilver and disilver salts of monophenyl phosphate.

(5) Monosilver and disilver salts of monophenyl phosphite.

(6) Monosilver salt of diphenyl phosphate.

(7) Monosilver and disilver salts of mono-($C_{1-22}$alkylphenyl) phosphates.

(8) Monosilver and disilver salts of mono-($C_{1-22}$alkylphenyl) phosphites.

(9) Monosilver salts of di-($C_{1-22}$alkylphenyl) phosphites.

Among them, preferable silver salts are the monosilver and disilver salts of monoalkyl phosphates (1), more preferably those having 6 to 22 carbon atoms in the alkyl group, and most preferably disilver salt of stearyl phosphate; the monosilver salts of dialkyl phosphates (3), more preferably those having 6 to 22 carbon atoms in the alkyl group, and most preferably monosilver salt of dioctyl phosphate; and the monosilver salts of di(alkylphenyl) phosphates (9), more preferably those having 4 to 22 carbon atoms in the alkyl group, and most preferably monosilver salt of di(4-t-butylphenyl) phosphate and monosilver salt of di(nonylphenyl) phosphate.

Moreover, the porous structure substance includes silica gel, activated carbon, zeolite, zirconium phosphate, calcium type ceramics and the like, and also includes those containing the above-mentioned metals and metal compounds; and silver oxide-containing soluble glass (see Japanese Patent Application Kokai No. 4-178,433). The particle sizes of these substances are preferably 50 μm or less, more preferably 0.1 to 10 μm.

Among them, zeolite may be either naturally occurring or synthetic. For example, naturally occurring zeolite includes analcine ($SiO_2/Al_2O_3$=3.6–5.6), chabazite ($SiO_2/Al_2O_3$=3.2–6.0 and 6.4–7.6 ), clinoptilite ($SiO_2/Al_2O_3$=8.5–10.5), erionite ($SiO_2/Al_2O_3$=5.8–7.4), foujasite ($SiO_2/Al_2O_3$=4.2–4.6), mordenite ($SiO_2/Al_2O_3$=8.34–10.0), phillipsite ($SiO_2/Al_2O_3$=2.6–4.4) and the like. These typical naturally occurring zeolites are preferably used in this invention.

On the other hand, typical examples of synthetic zeolite include A-type zeolite ($SiO_2/Al_2O_3$=1.4–2.4), X-type zeolite ($SiO_2/Al_2O_3$=2–3), Y-type zeolite ($SiO_2/Al_2O_3$=3–6), mordenite ($SiO_2/Al_2O_3$=9–10) and the like. These synthetic zeolites are preferably used in this invention. Particularly preferable are synthetic A-type zeolite, synthetic X-type zeolite, synthetic Y-type zeolite and synthetic or naturally occurring merdenite. The shape and particle size of zeolite are not critical; however, smaller particle size is preferred. For example, a particle size of 5 μm or less, particularly 0.1 to 2 μm, is preferable.

The calcium type ceramics include calcium phosphate, calcium carbonate, calcium silicate, hydroxyapatite and the like, and hydroxyapatite is preferred.

Hydroxyapatite has the composition $Ca_{10}(PO_4)_6(OH)_2$, and is the main constituent of bone and tooth, and is deemed to well adsorb protein and lipid, have a good affinity to living body constituents and have ion-exchangeability.

On the other hand, hydroxyapatite similars having a Ca/P molar ratio of 1.4–1.8 can be easily synthesized from a calcium salt and a phosphoric acid salt, and such similars can be used in this invention similarly to hydroxyapatite.

The amount of silver supported on the calcium type ceramics can be freely selected in the range of adsorption or ion-exchange; however, from the viewpoint of the structure retention of the calcium type ceramics and the antibacterial activity of silver, said amount is preferably 50% by weight or less, more preferably 0.001 to 30% by weight, based on the weight of the ceramics.

The antibacterial calcium type ceramics are calcined at high temperatures, preferably 800° C. or higher, thereafter finely pulverized, and then used as the antibacterial agent (B) of this invention. Since said antibacterial calcium type ceramics are calcined, the bonding of the silver supported thereon to the ceramics is strengthened, and the ceramics per se are shrunk and stabilized by calcination, so that the silver supported is not dissolved out by water-treatment. Hence, the ceramics can be mixed in any desired amount with the components (A) and (C) of this invention.

The antibacterial agent (B) of this invention may be an organic antibacterial agent which includes, for example, benzimidazole compounds, organoiodine compounds, ether compounds, haloalkyl compounds, nitrile compounds, sulfone compounds and the like.

The content of the antibacterial agent (B) is preferably 0.01 to 30 parts by weight, more preferably 0.1 to 20 parts by weight, and most preferably 1 to 15 parts by weight, per 100 parts by weight of the component (A). When the content of the component (B) is less than 0.01 part by weight, the antibacterial effect is poor, while when it is more than 30 parts by weight, the impact resistance and appearance of molded article are inferior. When a silver-containing antibacterial agent is used as the antibacterial agent (B), the silver content of the component (B) is not critical; however, it is preferably in the range of 0.1 to 20% by weight.

The component (C) of this invention is a compound or polymer having at least one functional group and a molecular weight of 300 to 10,000. The functional group includes carboxyl group, its metal salts, hydroxyl group, oxazoline group, acid anhydride group, ester group, epoxy group, amino group, amido group and the like.

The above compound or polymer includes, for example, compounds having a long chain alkyl group and at least one of the above-mentioned functional groups, and copolymers of an α-olefin such as ethylene, propylene or the like with an unsaturated compound having at least one of the above-mentioned functional groups, and said copolymers may be prepared by adding an unsaturated compound having at least one of the above-mentioned functional groups to an α-olefin polymer such as ethylene polymer, propylene polymer, ethylene-propylene copolymer or the like or by oxidizing polyethylene, polypropylene, ethylene-propylene copolymer or the like and then adding thereto a carboxyl group or the like. The long chain alkyl group has preferably 20 or more carbon atoms, more preferably 24 or more carbon atoms. Among the above compounds or polymers, preferable are functional group-containing polyethylenes, functional group-containing polypropylenes and montanic acid compounds.

The salt of carboxyl group includes salts with metals such as sodium, potassium, lithium, calcium, magnesium, aluminum, zinc, barium, cadmium, manganese, cobalt, lead, tin and the like.

The number of the functional groups in one molecule or in one mole is preferably in the range of 0.01 to 30.

The unsaturated compound containing at least one functional group used in the preparation of the component (C) may be any of the above-mentioned compounds. From the viewpoint of antibacterial activity, the functional groups in the component (C) are preferably carboxyl group, its salt, acid anhydride group and epoxy group.

The compound having the salt of carboxyl group is preferably a montanic acid salt, more preferably a combination of a montanic acid salt with montanic acid and/or a montanic acid ester.

The molecular weight of the component (C) of this invention is in the range of 300 to 10,000, preferably 400 to 8,000, more preferably 500 to 5,000 and most preferably 650 to 4,000. The main skeleton of the component (C) is preferably a hydrocarbon, and the number of carbon atoms of the hydrocarbon is preferably in the range of 20 to 700, more preferably 20 to 500 and most preferably 20 to 300. When the molecular weight of the component (C) is outside the above range, the antibacterial activity is inferior.

The amount of the component (C) of this invention is 0.01 to 30 parts by weight, preferably 0.05 to 20 parts by weight, more preferably 0.05 to 10 parts by weight, and most preferably 0.1 to 5 parts by weight, per 100 parts by weight of the component (A). When the amount is less than 0.01 part by weight, the antibacterial property is inferior and when it exceeds 30 parts by weight, the appearance of molded article is inferior.

When a zinc compound such as zinc oxide is added to the antibacterial resin composition of this invention in a proportion of 0.01 to 30 parts by weight per 100 parts by weight of the composition, an antifungal property can be imparted in addition to the antibacterial property to the composition. In this case, the smaller the particle size of the zinc compound used, the greater the antifungal effect.

The component (D), antistatic agent, may be any usually used antistatic agent. The antistatic agent used this invention includes low molecular weight antistatic agents and high molecular weight antistatic agents.

The low molecular weight antistatic agent includes anion type, cation type, nonion type and amphoteric type compounds. The anion type compounds include those represented by the following structural formulas:

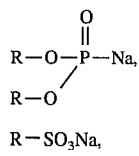

R—SO₃Na,

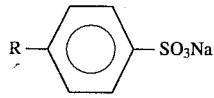

wherein R represents an alkyl group having 4 to 40 carbon atoms; the cation type compounds include those represented by the following structural formula:

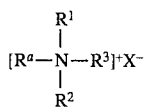

wherein $R^a$, $R^1$, $R^2$ and $R^3$ represent alkyl groups having 1 to 60 carbon atoms, preferably methyl groups and X represents a halogen atom; the nonion type compounds include those represented by the following structural formula:

RCOO—$R^b$(OH)$_n$ wherein R represents an alkyl group having 4 to 40 carbon atoms, —$R^b$(OH)$_n$ represents the residue of a polyvalent alcohol such as glycerine, sorbitol or the like in which m is 0 or an integer of 1 or more and by the following structural formulas:

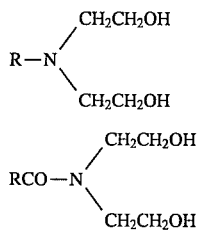

wherein R represents an alkyl group having 4 to 40 carbon atoms; and the amphoteric type compounds include those represented by the following structural formula:

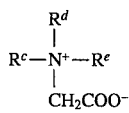

wherein $R^c$ $R^d$ and $R^e$ represent alkyl groups having 1 to 6 carbon atoms.

From the viewpoint of heat stability in the incorporation of the low molecular weight antistatic agent into the resin, the anion type and nonion type compounds are preferred.

The high molecular weight antistatic agent includes nonion type, anion type and cation type compounds. The nonion type compounds include those of the polyvinyl alcohol type represented by the following structural formula:

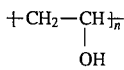

wherein n represents the number of repetitions of the recurring unit, the polyether type represented by the following structural formula:

—[—CH₂—CH₂—O—]$_n$— wherein n represents the number of the repetitions of the recurring unit, the unsaturated group-containing polyether type represented by the following structural formula:

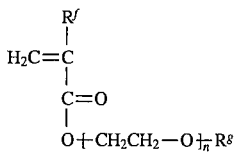

wherein $R^f$ represents a hydrogen atom or a methyl group, $R^g$ represents an alkyl group having 1 to 40 carbon atoms and n represents the number of repetitions of the recurring unit, the polyetherester type represented by the following structural formula:

—[—CO—(CH₂—CH₂—O)$_n$—OCOR$^h$CO—]$_{n'}$— wherein $R^h$ represents an alkyl group having 1 to 12 carbon atoms and n and n' represent the numbers of the repetitions of the respective recurring units. The anion type compounds include those of the polyacrylic acid type represented by the following structural formula:

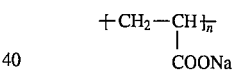

wherein n represents the number of repetitions of the recurring unit, and the polystyrenesulfonic acid type represented by the following structural formula:

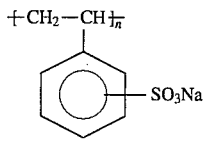

wherein n represents the number of repetitions of the recurring unit; the cation type compound includes those of the polyacrylic acid ester type represented by the following structural formula:

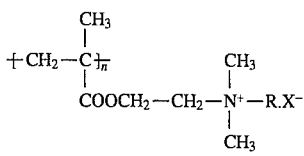

wherein n represents the number of repetitions of the recurring unit and X represents a halogen atom, the polystyrene type represented by the following structural formula:

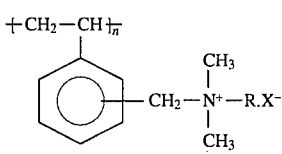

wherein n represents the number of repetitions of the recurring unit and X represents a halogen atom, and the polydiallyl compound type represented by the following structural formula:

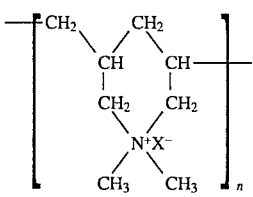

wherein n represents the number of repetitions of the recurring unit and X represents a halogen atom.

The above high molecular weight antistatic agent is preferably of the nonion type and the anion type from the viewpoint of thermal stability in the incorporation into the resin.

The component (D) may be used alone or in combination of two or more.

Particularly preferable examples of the antistatic agent include sodium stearylsulfonate, sodium laurylsulfonate, stearic acid monoglyceride, N,N-bis(hydroxyethyl)stearylamine, polyethylene glycol (molecular weight: 200 to 5,000,000), polyethylene oxide (molecular weight: 200 to 5,000,000), unsaturated group-containing polyether type polysodium acrylate (molecular weight: 500 to 300,000) and the like.

The amount of the component (D) used is 0.01 to 30 parts by weight, preferably 0.1 to 20 parts by weight, more preferably 1 to 20 parts by weight, per 100 parts by weight of the component (A) of this invention. When the amount of the component (D) is less than 0.01 part by weight, the antibacterial effect is poor and when the amount exceeds 30 parts by weight, the impact resistance is inferior.

When the component (C) and the component (D) are used in combination, the (C)/(D) weight ratio is preferably 10/90 to 90/10, more preferably 20/80 to 80/20. When the components (C) and (D) are used in combination in said range a better antibacterial property is obtained.

In this case, the total amount of the component (C) and the component (D) used is 0.01 to 30 parts by weight, preferably 0.05 to 20 parts by weight, more preferably 0.05 to 10 parts by weight and most preferably 0.1 to 5 parts by weight, per 100 parts by weight of the component (A) of this invention. When the total amount is less than 0.01 part by weight, the antibacterial effect is inferior while when the total amount is more than 30 parts by weight, the appearance of molded article is inferior.

The polyamide elastomer constituting the component (E) of this invention includes those composed of (X) a hard segment consisting of an aminocarboxylic acid or lactam having 6 or more carbon atoms or a nylon mn salt in which m+n≧12 and (Y) a soft segment consisting of a polyol, specifically poly(alkylene oxide) glycol, the proportion of the hard segment (X) in the elastomer being 10 to 95% by weight, preferably 20 to 90% by weight, more preferably 40 to 60% by weight. When the proportion of the hard segment (X) in the polyamide elastomer is less than 10% by weight, the compatibility with the component (A) (the styrene resin) is inferior and when the proportion is more than 95% by weight, the impact resistance is inferior.

The above-mentioned aminocarboxylic acid or lactam having 6 or more carbon atoms or nylon mn salt in which m+n≧12 [the hard segment (X)] includes aminocarboxylic acids such as ω-aminocaproic acid, ω-aminoenanthic acid, ω-aminocaprylic acid, ω-aminopelargonic acid, ω-aminocapric acid, 11-aminoundecanoic acid, 12-aminododecanoic acid and the like; lactams such as caprolactam, laurolactam and the like; and nylon salts such as nylon 6,6, nylon 6,10, nylon 6,12, nylon 11,6, nylon 11,10, nylon 12,6, nylon 11,12, nylon 12,10, nylon 12,12 and the like.

The poly(alkylene oxide) glycol [the soft segment (Y)] includes polyethylene glycol, poly(1,2- and 1,3-propylene oxide) glycol, poly(tetramethylene oxide) glycol, poly(hexamethylene oxide) glycol, ethylene oxide-propylene oxide block or random copolymer, ethylene oxide-tetrahydrofuran block or random copolymer and the like.

The number average molecular weight of the poly(alkylene oxide) glycol (Y) is 200 to 60,000, preferably 250 to 6,000. Among the above-mentioned poly(alkylene oxide) glycols, polyethylene glycol is particularly preferable because it is excellent in antistatic property.

Incidentally, in this invention, the poly(alkylene oxide) glycol as the soft segment (Y) may be aminated, epoxidized or carboxylated at both terminals.

The above components (X) and (Y) may be bonded through an ester linkage or an amido linkage corresponding to the terminal group of the component (Y).

In this bonding, a third component such as a dicarboxylic acid, a diamine or the like may be used. This dicarboxylic acid includes those having 4 to 20 carbon atoms, for example, aromatic dicarboxylic acids such as terephthalic acid, isophthalic acid, phthalic acid, naphthalene-2,6-dicarboxylic acid, naphthalene-2,7-dicarboxylic acid, diphenyl-4,4-dicarboxylic acid, diphenoxyethane dicarboxylic acid, sodium 3-sulfoisophthalate and the like; alicyclic dicarboxylic acids such as 1,4-cyclohexane dicarboxylic acid, 1,2-cyclohexane dicarboxylic acid, dicyclohexyl-4,4-dicarboxylic acid and the like; aliphatic dicarboxylic acids such as succinic acid, oxalic acid, adipic acid, sebacic acid, dodecane dicarboxylic acid and the like; etc. as well as mixtures thereof. In particular, terephthalic acid, isophthalic acid, 1,4-cyclohexane dicarboxylic acid, sebacic acid, adipic acid and dodecane dicarboxylic acid are preferably used in view of polymerizability, color tone and physical properties.

The diamine includes aromatic, alicyclic and aliphatic diamines. Specifically, the aromatic diamine includes p-phenylenediamine, m-phenylenediamine, diaminodiphenyl ether, diaminodiphenylmethane and the like; the alicyclic diamine includes piperazine, diaminodicyclohexylmethane, cyclohexyldiamine and the like; and the aliphatic diamine includes those having 2 to 12 carbon atoms such as hexamethylenediamine, ethylenediamine, propylenediamine, octamethylenediamine and the like. Among these diamines, hexamethylenediamine is preferred.

The method of synthesizing the polyamide elastomer is not critical, and there may be adopted the methods disclosed in Japanese Patent Application Kokoku No. 56-45,419, Japanese Patent Application Kokai No. 55-133,424 and the like. The above polyamide elastomers may be used alone or in combination of two or more.

On the other hand, in the polyester elastomer constituting the component (E), its hard segment is a polyester obtained by polycondensation of a dicarboxylic acid compound and a dihydroxy compound, polycondensation of a hydroxycarboxylic acid compound, ring-opening polycondensation of a lactone compound or polycondensation of a mixture of them, and either homopolyester or copolyester may be used to obtain the effect of this invention.

The above dicarboxylic acid compound includes terephthalic acid, isophthalic acid, naphthalene dicarboxylic acid, diphenyl dicarboxylic acid, diphenyl ether dicarboxylic acid, diphenylethane dicarboxylic acid, cyclohexane dicarboxylic acid, adipic acid, sebacic acid and the like as well as alkyl-, alkoxy-, and halogen-substituted derivatives thereof and the like. These dicarboxylic acid compounds may be used in the form a derivative capable of forming an ester such as a lower alcohol ester, for example, dimethyl ester or the like. These dicarboxylic acid compounds may be used alone or in combination of two or more.

The above dihydroxy compound includes ethylene glycol, propylene glycol, butanediol, neopentyl glycol, butanediol, hydroquinone, resorcinol, dihydroxydiphenyl ether, cyclohexanediol, 2,2-bis(4-hydroxyphenyl)propane and the like, and also includes polyoxyalkylene glycols and alkyl-, alkoxy- and halogen-substituted polyoxyalkylene glycols. These dihydroxy compounds may be used alone or in combination of two or more.

The above hydroxycarboxylic acid includes hydroxybenzoic acid, hydroxynaphthoic acid, diphenylene hydroxycarboxylic acid and the like, and also includes alkyl-, alkoxy- and halogen-substituted derivatives of these compounds. These hydroxycarboxylic acid compounds may be used alone or in combination of two or more.

The above lactone compound includes ε-caprolactone and the like.

Preferable examples of the polyester component as the hard segment include polybutylene terephthalate, polyethylene terephthalate and the like.

The soft segment of the polyester elastomer includes those poly(alkylene oxide) glycols which are mentioned as to the soft segment of the polyamide elastomer, and the proportion thereof to the hard segment is similar to the case of the polyamide elastomer.

The above-mentioned components (E) may be used alone or in combination of two or more.

The molecular weight of the elastomer constituting the component (E) is not critical, and in the case of polyamide elastomer, the reduced viscosity ($\eta_{sp}/C$) thereof as measured in formic acid at a concentration of 0.5 g/100 ml at 25° C. is 0.5 to 3 dl/g. In the case where the component (E) is the polyester elastomer, the intrinsic viscosity [$\eta$] as measured in o-chlorophenol at 35° C. is preferably 0.5 to 2.5.

The blending proportion of the styrene resin which is the component (A) of this invention to the polyamide elastomer and/or polyester elastomer which is the component (E) is such that the amount of the component (A) is 99.9 to 10% by weight, preferably 99 to 40% by weight, more preferably 99 to 70% by weight and the amount of the component (E) is 0.1 to 90% by weight, preferably 1 to 60% by weight, more preferably 1 to 30% by weight. When the amount of the component (A) is more than 99.9% by weight and the amount of the component (E) is less than 0.1% by weight, the impact resistance and antibacterial property are inferior, while when the amount of the component (A) is less than 10% by weight and the amount of the component (E) is more than 90% by weight, the stiffness is inferior.

In the system in which the component (A) and the component (E) are used in combination, the component (C) and the component (D) are further co-used. In this case, the weight ratio of the component (C)/the component (D) is preferably 10/90 to 90/10, more preferably 20/80 to 80/20.

When the component (C) and the component (D) are co-used in this range, a higher antibacterial property is obtained.

In this case, the total amount of the component (C) and the component (D) used is 0.01 to 30 parts by weight, preferably 0.05 to 20 parts by weight, more preferably 0.05 to 10 parts by weight and most preferably 0.1 to 5 parts by weight, per 100 parts by weight in total of the components (A) and (E). When the amount is less than 0.01 part by weight, the antibacterial property is inferior, while when the amount is more than 30 parts by weight, the surface appearance of molded article is inferior.

Incidentally, the antibacterial resin composition of this invention may contain fillers such as glass fiber, carbon fiber, metal fiber, glass beads, wollastonite, asbestos, calcium carbonate, talc, mica, glass flake, kaolin, barium sulfate, graphite, molybdenum disulfide, magnesium oxide, zinc oxide whisker, potassium titanate whisker and the like, alone or in combination of two or more. Among these fillers, glass fiber and carbon fiber of 6 to 60 μm in fiber diameter and 30 μm or more in fiber length are preferred. These fillers are used preferably in an amount within the range of 5 to 150 parts by weight per 100 parts by weight of the composition of this invention.

The antibacterial resin composition of this invention may also contain additives such as known coupling agent, flame retarder, antioxidant, plasticizer, coloring agent, lubricant, silicone oil and the like.

Moreover, the antibacterial resin composition of this invention may be blended with at least one other polymer depending upon the required properties, for example, polyethylene, polypropylene, polyamide, polyester, polycarbonate, polysulfone, polyethersulfone, polyphenylene sulfide, liquid crystal polymer, polyvinylidene fluoride, styrene-vinyl acetate copolymer and the like.

The antibacterial resin composition of this invention may be prepared by kneading the necessary components by means of an extruder, a Banbury mixer, a kneader, a roll or the like. A preparation method using a twin screw extruder is preferred. The necessary components may be kneaded at one time or by a multistage-addition system.

The antibacterial resin composition of this invention thus prepared may be formed into various molded articles by injection molding, sheet-extrusion, vacuum molding, profile molding, foam molding, injection press, press molding, blow molding or the like.

When the composition is injection-molded, the injection speed should be made higher for obtaining a better antibacterial property.

The molded articles obtained by the above-mentioned molding methods can be applied to various parts of toilet seat, moistener, water purifier, air conditioner, sundry goods, other various appliances, telephone and the like; housings; etc. utilizing their excellent properties.

The antibacterial resin composition of this invention is excellent in antibacterial activity and surface appearance of molded article and are useful in various applications as mentioned above.

DESCRIPTION OF PREFERRED EMBODIMENTS

This invention is explained below in more detail referring to Examples and Comparative Examples which are merely by way of illustration and not by way of limitation.

In the Examples and Comparative Examples, part and % are by weight unless otherwise specified. The various evaluations in the Examples and Comparative Examples were conducted by the following methods.
Antibacterial activity Into a specimen (resin flat plate) was inoculated 0.2 ml of a bacterial solution of staphylococcus (about $10^6$ cells per ml), and a polyethylene film was intimately contacted with the specimen, after which the resulting assembly was stored at 35° C. At the start of and 24 hours after the storing, live bacteria were washed out with a SCDLP agar medium (manufactured by Nihon Seiyaku K. K.) and the washing was subjected to measurement of the number of live bacteria by an agar plating method (at 35° C. for 2 days) using a medium for measuring the number of bacteria, and the number of live bacterial per specimen was calculated from the result obtained. Incidentally, the initial number of bacteria in the Examples and the Comparative Examples was $3\times10^5$, provided that in Examples 20 to 26, the initial number of bacteria was $1\times10^5$.
Surface appearance of molded article A plate-shaped article was prepared by molding and then the surface appearance thereof was observed visually in accordance with the following criteria:

o: Good in appearance x: Inferior in appearance

Impact resistance

Izod impact strength was measured according to ASTM D256 at a thickness of ⅛" with notch at 23° C.
Stiffness Flexural modulus was measured according to ASTM D790.

Reference Example

Preparation of rubbery polymers (a)-1 to (a)-4

The rubbery polymers shown in Table 1 were used as the component (a) of the styrene resin (A) in this invention.

TABLE 1

| Rubbery polymer | Content | Remarks |
|---|---|---|
| (a) - 1 | Polybutadiene | Latex having average particle size of 3,500 Å |
| (a) - 2 | Ethylene-propylene-ethylidene norbornene copolymer | |
| (a) - 3 | Styrene-butadiene-styrene block copolymer | TR2000 manufactured by Japan Synthetic Rubber Co., Ltd. |
| (a) - 4 | Hydrogenated styrene-butadiene-styrene block co-polymer | Kraton G1650 manufactured by Shell. |

Preparation of resin A-1 to A-8

Resins were prepared by polymerizing the monomer or monomers constituting the monomeric component (b) of this invention in the presence of one of the rubbery polymers (a)-1 to (a)-4 shown in Table 1 and other resins were also prepared by polymerizing the same monomer or monomers as above in the absence of the rubbery polymer. The compositions of these resins are shown in Table 2, in which ST means styrene and AN means acrylonitrile.

TABLE 2

| Kind of Resin | Component (a) | | Monomeric component (b) | | Other components |
|---|---|---|---|---|---|
| | Kind | Parts | ST(parts) | AN(parts) | |
| A-1 | (a)-1 | 40* | 44 | 16 | — |
| A-2 | (a)-2 | 30 | 51 | 19 | — |
| A-3 | (a)-3 | 30 | 51 | 19 | — |
| A-4 | (a)-4 | 30 | 51 | 19 | — |
| A-5 | (a)-1 | 40* | 60 | — | — |
| A-6 | — | — | 73 | 27 | — |
| A-7 | — | — | 100 | — | — |
| A-8 | — | — | 66 | 24 | 10 (Hydroxyethyl acrylate) |

Note:
*: In terms of solids content.

Incidentally, resins A-1, A-5 and A-8 were obtained by emulsion polymerization, resins A-2, A-3, A-4, A-6 and A-7 were obtained by solution polymerization.
Silver-containing antibacterial agents B-1 to B-4

B-1: Bactekiller-BM103 manufactured by KANEBO LTD.

B-2: NOVARON AG300 manufactured by TOAGOSEI CHEMICAL INDUSTRY CO., LTD.

B-3: Apacider AW manufactured K. K. Sangi

B-4: Amteclean Z manufactured by Matsushita Amtech K. K.

B-5: Zeomic XAW10D manufactured by Shinanen Ceramics

Component (C)

C-1: Ethylene-methacrylic acid copolymer whose average molecule consists of 30 moles of ethylene (number of carbon atoms: 60) and 2 moles of methacrylic acid.

C-2: Ethylene-methacrylic acid copolymer, whose average molecule consists of 60 moles of ethylene (number of carbon atoms: 120) and 2 moles of methacrylic acid.

C-3: Ethylene-methacrylic acid copolymer, whose average molecule consists of 250 moles of ethylene (number of carbon atoms: 500) and 2 moles of methacrylic acid.

C-4: Montanic acid (number of carbon atoms: about 30)

C-5: Ethylene polymer, whose average molecule consists of 30 moles of ethylene.

C-6: Calcium montanate

C-7: Stearic acid

C-8: Montanic acid ester/calcium montanate (OP wax manufactured by Hoechst)

C-9: Montanic acid ester (E wax manufactured by Hoechst)

Component (D)

D-1: Polyethylene oxide (molecular weight: 200,000–300,000)

D-2:

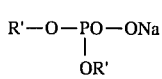

in which R' represents a $C_{12}$ alkyl group

Component (E)

Preparation of elastomer E-1

Nylon 6 polymer block was prepared by ring-opening polycondensation of ε-caprolactam and both terminals of the product were converted to carboxylic acid by treating the same with adipic acid, after which polyethylene glycol was addition-polymerized to obtain a polyamide elastomer [referred to hereinafter as elastomer E-1]. The molar ratio of the polyamide component to the polyethylene glycol component was about 50/50, and the reduced viscosity thereof as measured in formic acid at 25° C. at a concentration of 0.5 g/100 ml was 1.50 dl/g. The melting point of the polyamide as measured by DSC (differential scanning calorimeter) was 205° C.

EXAMPLES 1 TO 28 AND COMPARATIVE EXAMPLES 1 to 7

Preparation of antibacterial resin compositions

Each of the above-mentioned styrene resin, silver-containing antibacterial agent and additive was dried to a water content of 0.1% or less and they were mixed with the compounding recipes shown in Tables 3 to 7. The resulting mixture was subjected to melt-mixing with a vented twin screw extruder to pelletize the mixture. The pellets thus obtained were dried to a water content of 0.1% or less and injection-molded into test species for evaluating antibacterial property and surface appearance of molded article. The test species were subjected to evaluation by the above-mentioned methods to obtain the results shown in Tables 3 to 8.

As is clear from Tables 3 to 8, the antibacterial resin compositions of this invention (Examples 1 to 26) were superior in antibacterial property and surface appearance of molded article.

On the other hand, in Comparative Example 1, the amount of the component (B) used is larger than the range of this invention and hence the surface appearance of molded article was inferior. In Comparative Example 2, the amount of the component (B) used is smaller than the range of this invention and hence the antibacterial property was inferior. In Comparative Example 3, the amount of the component (C) used is smaller than the range of this invention and hence the antibacterial property was inferior. In Comparative Example 4, the amount of the component (C) used is larger than the range of this invention and hence the surface appearance of molded article was inferior. In Comparative Examples 5, 6 and 7, the kinds of the component (C) used are other than specified in this invention and hence the antibacterial property was inferior.

TABLE 3

| | Example | | | | | | |
|---|---|---|---|---|---|---|---|
| | 1 | 2 | 3 | 4 | 5 | 6 | 7 |
| Compounding recipe | | | | | | | |
| Component (A) | | | | | | | |
| Kind | A-1 | A-2 | A-3 | A-4 | A-5 | A-1 | A-1 |
| Parts | 40 | 40 | 40 | 40 | 40 | 40 | 40 |
| Kind | A-6 | A-6 | A-6 | A-6 | A-7 | A-6 | A-6 |
| Parts | 60 | 60 | 60 | 60 | 60 | 60 | 60 |
| Component (B) | | | | | | | |
| Kind | B-1 | B-1 | B-1 | B-1 | B-1 | B-2 | B-3 |
| Parts | 3 | 3 | 3 | 3 | 3 | 3 | 3 |
| Component (C) | | | | | | | |
| Kind | C-1 | C-1 | C-1 | C-1 | C-1 | C-1 | C-1 |
| Parts | 2 | 2 | 2 | 2 | 2 | 2 | 2 |
| Evaluation results | | | | | | | |
| Antibacterial activity (cells) | | | | | | | |
| 0 hr | $3 \times 10^5$ | $3 \times 10^5$ | $3 \times 10^5$ | $3 \times 10^5$ | $3 \times 10^5$ | $3 \times 10^5$ | $3 \times 10^5$ |
| 24 hrs | <10 | <10 | <10 | <10 | <10 | <10 | <10 |
| Surface appearance of molded article | o | o | o | o | o | o | o |

TABLE 4

| | Example | | | | | | | | |
|---|---|---|---|---|---|---|---|---|---|
| | 8 | 9 | 10 | 11 | 12 | 13 | 14 | 15 | 16 |
| Compounding recipe | | | | | | | | | |
| Component (A) | | | | | | | | | |
| Kind | A-1 | A-1 | A-1 | A-1 | A-1 | A-1 | A-1 | A-1 | A-1 |
| Parts | 40 | 40 | 40 | 40 | 40 | 40 | 40 | 40 | 40 |
| Kind | A-6 | A-6 | A-6 | A-6 | A-7 | A-6 | A-6 | A-6 | A-6 |
| Parts | 60 | 60 | 60 | 60 | 60 | 60 | 60 | 60 | 60 |
| Component (B) | | | | | | | | | |
| Kind | B-4 | B-4 | B-4 | B-4 | B-4 | B-4 | B-4 | B-4 | B-4 |
| Parts | 3 | 3 | 3 | 3 | 0.5 | 3 | 0.1 | 3 | 3 |
| Component (C) | | | | | | | | | |
| Kind | C-1 | C-2 | C-4 | C-6 | C-1 | C-6 | C-1 | C-1 | C-1 |
| Parts | 2 | 2 | 2 | 2 | 2 | 0.5 | 3 | 7 | 13 |
| Evaluation results | | | | | | | | | |
| Antibacterial activity (cells) | | | | | | | | | |
| 0 hr | $3 \times 10^5$ | $3 \times 10^5$ | $3 \times 10^5$ | $3 \times 10^5$ | $3 \times 10^5$ | $3 \times 10^5$ | $3 \times 10^5$ | $3 \times 10^5$ | $3 \times 10^5$ |
| 24 hrs | <10 | <10 | <10 | <10 | <10 | <10 | $1 \times 10^2$ | <10 | <10 |
| Surface appearance of molded article | ○ | ○ | ○ | ○ | ○ | ○ | ○ | ○ | ○ |

TABLE 5

| | Comparative Example | | | | | | |
|---|---|---|---|---|---|---|---|
| | 1 | 2 | 3 | 4 | 5 | 6 | 7 |
| Compounding recipe | | | | | | | |
| Component (A) | | | | | | | |
| Kind | A-1 | A-1 | A-1 | A-1 | A-1 | A-1 | A-1 |
| Parts | 40 | 40 | 40 | 40 | 40 | 40 | 40 |
| Kind | A-6 | A-6 | A-6 | A-6 | A-6 | A-6 | A-6 |
| Parts | 60 | 60 | 60 | 60 | 60 | 60 | 60 |
| Component (B) | | | | | | | |
| Kind | B-1 | B-1 | B-1 | B-1 | B-1 | B-1 | B-1 |
| Parts | 50 | 0.001 | 3 | 3 | 3 | 3 | 3 |
| Component (C) | | | | | | | |
| Kind | C-1 | C-1 | C-1 | C-1 | C-3 | C-5 | C-7 |
| Parts | 2 | 2 | 0.001 | 40 | 2 | 2 | 2 |
| Evaluation results | | | | | | | |
| Antibacterial activity (cells) | | | | | | | |
| 0 hr | $3 \times 10^5$ | $3 \times 10^5$ | $3 \times 10^5$ | $3 \times 10^5$ | $3 \times 10^5$ | $3 \times 10^5$ | $3 \times 10^5$ |
| 24 hrs | <10 | $3 \times 10^5$ | $5 \times 10^4$ | <10 | $6 \times 10^4$ | $6 \times 10^4$ | $1 \times 10^4$ |
| Surface appearance of molded article | x | ○ | ○ | x | ○ | ○ | ○ |

TABLE 6

| | Example | | | | |
|---|---|---|---|---|---|
| | 17 | 18 | 19 | 20 | 21 |
| Compounding recipe | | | | | |
| Component (A) | | | | | |
| Kind | A-1 | A-1 | A-1 | A-1 | A-1 |
| Parts | 60 | 60 | 60 | 60 | 60 |
| Kind | A-5 | A-5 | A-5 | A-5 | A-5 |
| Parts | 40 | 40 | 40 | 40 | 40 |
| Component (B) | | | | | |
| Kind | B-5 | B-5 | B-5 | B-5 | B-4 |
| Parts | 1 | 1 | 1 | 0.5 | 1 |
| Component (F) | | | | | |
| Kind | D-1 | D-2 | D-1 | D-1 | D-1 |
| Parts | 2 | 2 | 2 | 2 | 2 |
| Kind | C-8 | C-8 | C-9 | C-8 | C-8 |
| Parts | 1 | 1 | 1 | 2 | 1 |
| Evaluation results | | | | | |
| Antibacterial activity (cells) | | | | | |
| 0 hr | $3 \times 10^5$ | $3 \times 10^5$ | $3 \times 10^5$ | $3 \times 10^5$ | $3 \times 10^5$ |
| 24 hrs | <10 | <10 | <10 | <10 | <10 |
| Surface appearance of molded article | ○ | ○ | ○ | ○ | ○ |

TABLE 7

| Compounding recipe | Example | | | | | | |
|---|---|---|---|---|---|---|---|
| | 22 | 23 | 24 | 25 | 26 | 27 | 28 |
| Component (A) | | | | | | | |
| Kind | A-1 | A-1 | A-1 | A-1 | A-1 | A-1 | A-1 |
| Parts | 35 | 35 | 35 | 35 | 35 | 35 | 35 |
| Kind | A-6 | A-6 | A-6 | A-6 | A-6 | A-6 | A-6 |
| Parts | 45 | 45 | 45 | 45 | 45 | 45 | 45 |
| Kind | A-8 | A-8 | A-8 | A-8 | A-8 | A-8 | A-8 |
| Parts | 10 | 10 | 10 | 10 | 10 | 10 | 10 |
| Component (E) | | | | | | | |
| Kind | E-1 | E-1 | E-1 | E-1 | E-1 | E-1 | E-1 |
| Parts | 10 | 10 | 10 | 10 | 10 | 10 | 10 |
| Component (B) | | | | | | | |
| Kind | B-5 | B-5 | B-6 | B-5 | B-5 | B-5 | B-5 |
| Parts | 1 | 1 | 1 | 0.5 | 1 | 1 | 1 |
| Component (F) | | | | | | | |
| Kind | D-1 | D-1 | D-1 | D-1 | D-1 | D-2 | D-1 |
| Parts | 2 | 1 | 1 | 1 | 1 | 1 | 1 |
| Kind | C-8 | C-8 | C-8 | C-8 | C-8 | C-9 | C-8 |
| Parts | 0.5 | 0.5 | 0.5 | 0.5 | 0.5 | 0.5 | 1.0 |

TABLE 8

| Evaluation results | Example | | | | | | |
|---|---|---|---|---|---|---|---|
| | 22 | 23 | 24 | 25 | 26 | 27 | 28 |
| Antibacterial activity (cells) | | | | | | | |
| 0 hr | $1 \times 10^5$ | $1 \times 10^5$ | $1 \times 10^5$ | $1 \times 10^5$ | $1 \times 10^5$ | $1 \times 10^5$ | $1 \times 10^5$ |
| 24 hrs | <10 | <10 | 10 | <10 | <10 | <10 | <10 |
| Surface appearance of molded article | ○ | ○ | ○ | ○ | ○ | ○ | ○ |
| Impact resistance (kg · cm/cm) | 26 | 27 | 27 | 27 | 27 | 27 | 27 |
| Stiffness (kg/cm$^2$) | 25000 | 25000 | 25000 | 25000 | 25000 | 25000 | 25000 |

EXAMPLE 29

In this Example, the antibacterial agents shown in Table 9 were used in 20% solution in n-hexane as the antibacterial agent (B).

TABLE 9

| Kind of antibacterial agent | Name of compound |
|---|---|
| B-6 | 4,5-Dichloro-2-octyl-3-isothiazolone |
| B-7 | Methylene bisthiocyanate |
| B-8 | 2-Pyridinethiol-1-oxide sodium salt |

| Preparation of graft copolymer (I) | |
|---|---|
| Rubbery polymer (a)-1 (as solids) | 50 parts |
| Sodium dodecylbenzenesulfonate | 3 parts |
| Deionized water | 110 parts |
| Cumene hydroperoxide | 0.05 part |
| Sodium pyrophosphate | 0.2 part |
| Dextrose | 0.25 part |
| Ferric sulfate | 0.002 part |
| Antibacterial agent (B-6) (as effective component) | 5 parts |

The above components were placed in a flask and kept at 50° C. with stirring under a nitrogen stream, and the following monomer mixture was added thereto in ten hours and subjected to reaction at 50° C. for a further two hours to complete the polymerization:

| | |
|---|---|
| Styrene | 25 parts |
| Acrylonitrile | 15 parts |
| Methyl methacrylate | 5 parts |
| n-Dodecylmercaptan | 1.0 part |
| Cumene hydroperoxide | 0.2 part |

The final polymerization conversion of the copolymer latex obtained was 90%. This copolymer latex was coagulated with an aqueous magnesium sulfate solution, then washed with water and dried to obtain a graft copolymer powder.

| | |
|---|---|
| Syrene | 60 parts |
| Acrylonitrile | 30 parts |

-continued

| | |
|---|---|
| Methyl methacrylate | 10 parts |
| Toluene | 50 parts |
| n-Dodecylmercaptan | 0.3 part |

The above components were placed in a stainless steel reactor and the temperature was elevated to 140° C. with stirring under a nitrogen atmosphere, at which temperature polymerization was conducted. The polymerization conversion after the polymerization was 80%. The copolymer obtained was subjected to stripping, grinding and drying to obtain a copolymer powder.

| Preparation of antibacterial resin composition | |
|---|---|
| The above graft copolymer (I) | 30 parts |
| The above copolymer (II) | 70 parts |
| Silver-containing antibacterial agent B-4 | 5 parts |

Using a twin screw extruder, the above components were melt-kneaded to obtain an antibacterial resin composition comprising 15% of the rubbery copolymer (A), 1.5% of the antibacterial agent B-6 and 5%, based on the weight of the antibacterial resin, of the silver-containing antibacterial agent B-4. The physical properties of this antibacterial resin composition are shown in Table 10.

EXAMPLES 30 to 39

The same procedure as in Example 29 was repeated, except that the rubbery polymer, the antibacterial agent, the monomer components, the deionized water and the silver-containing antibacterial agent were changed as shown in Table 10, to obtain graft copolymers (I), copolymers (II), antibacterial resins and antibacterial resin compositions. The results are shown in Table 10.

As is clear from Table 10, Examples 29 to 39 are excellent in physical properties balance in respect of impact resistance and stiffness and good in antibacterial properties and appearance of molded article.

TABLE 10

|  | Example 29 | Example 30 | Example 31 | Example 32 | Example 33 | Example 34 | Example 35 | Example 36 | Example 37 | Example 38 | Example 39 |
|---|---|---|---|---|---|---|---|---|---|---|---|
| Compounding recipe | | | | | | | | | | | |
| [Graft copolymer (I)] | | | | | | | | | | | |
| Rubbery polymer (a)-1 | 50 | — | 50 | 50 | 50 | 20 | 20 | 50 | 20 | 20 | 50 |
| Rubbery polymer (a)-2 | — | 50 | — | — | — | — | — | — | 30 | — | — |
| Antibacterial agent B-6 | 5 | 5 | — | — | 5 | 5 | 5 | 5 | — | 10 | 0.1 |
| Antibacterial agent B-7 | — | — | 5 | — | — | — | — | — | 2.5 | — | — |
| Antibacterial agent B-8 | — | — | — | 5 | — | — | — | — | 2.5 | — | — |
| Styrene | 25 | 25 | 25 | 25 | 25 | 53 | 35 | 20 | 32 | 50 | 34.9 |
| Acrylonitrile | 15 | 15 | 15 | 15 | 15 | 22 | — | — | 13 | 20 | 15 |
| Methyl methacrylate | 5 | 5 | 5 | 5 | 5 | — | 40 | 25 | — | — | — |
| Amount of graft copolymer (I) used (parts) | 30 | 30 | 30 | 30 | 30 | 100 | 100 | 30 | 100 | 100 | 30 |
| [Copolymer (II)] | | | | | | | | | | | |
| Styrene | 60 | 60 | 60 | 60 | 60 | — | — | 40 | — | — | 70 |
| Acrylonitrile | 30 | 30 | 30 | 30 | 30 | — | — | — | — | — | 30 |
| Methyl methacrylate | 10 | 10 | 10 | 10 | 10 | — | — | 60 | — | — | — |
| Amount of copolymer (II) used (parts) | 70 | 70 | 70 | 70 | 70 | — | — | 70 | — | — | 70 |
| Contents in antibacterial resin (%) | | | | | | | | | | | |
| Rubbery polymer (A) | 15 | 15 | 15 | 15 | 15 | 20 | 20 | 15 | 50 | 20 | 15 |
| Antibacterial agent (B) | 1.5 | 1.5 | 1.5 | 1.5 | 1.5 | 5 | 5 | 1.5 | 5 | 10 | 0.03 |
| Amount of silver-containing antibacterial agent B-4 (parts) | 5 | 5 | — | — | — | — | — | — | — | — | — |
| Evaluation results | | | | | | | | | | | |
| Impact resistance (kg · cm/cm) | 20 | 20 | 25 | 25 | 25 | 30 | 20 | 25 | 22 | 18 | 26 |
| Stiffness (kg/cm$^2$) | 25000 | 24000 | 25000 | 25000 | 25000 | 22000 | 25000 | 25000 | 26000 | 20000 | 25000 |
| Appearance of molded article | ○ | ○ | ○ | ○ | ○ | ○ | ○ | ○ | ○ | ○ | ○ |
| Antibacterial activity (cells) | | | | | | | | | | | |
| 0 hr | 1 × 10$^5$ | 1 × 10$^5$ | 1 × 10$^5$ | 1 × 10$^5$ | 1 × 10$^5$ | 1 × 10$^5$ | 1 × 10$^5$ | 1 × 10$^5$ | 1 × 10$^5$ | 1 × 10$^5$ | 1 × 10$^5$ |
| 24 hrs | <10 | <10 | 20 | 20 | 20 | <10 | <10 | 20 | <10 | <10 | <20 |

What is claimed is:

1. An antibacterial resin composition which comprises
(A) 100 parts by weight of an aromatic alkenyl resin;
(B) 0.01 to 30 parts by weight of an inorganic metal compound or a porous structure substrate which has been subjected to ion-exchange with a metal ion, wherein said metal is selected from the group consisting of silver, copper, zinc, mercury, tin, lead, bismuth, cadmium, chromium, cobalt, nickel, iron, manganese, arsenic, antimony and barium; and
(C) 0.01 to 30 parts by weight of a polyethylene comprising a functional group selected from the group consisting of carboxyl group, a salt of said carboxyl group, hydroxyl group, oxazoline group, acid anhydride group, ester group, epoxy group and amino group, a polypropylene comprising a functional group selected from the group consisting of carboxyl group, a salt of said carboxyl group, hydroxyl group, oxazoline group, acid anhydride group, ester group, epoxy group and amino group or a compound comprising a functional group selected from the group consisting of carboxyl group, a salt of said carboxyl group, hydroxyl group, oxazoline group, acid anhydride group, ester group, epoxy group and amino group having a long chain alkyl group containing at least 20 carbon atoms, wherein said component (C) has a molecular weight of 300 to 10,000.

2. The antibacterial resin composition according to claim 1, wherein said inorganic metal compound comprises a metal selected from the group consisting of silver, copper and zinc and wherein said metal ion is an ion of a metal selected from the group consisting of silver, copper and zinc.

3. The antibacterial resin composition according to claim 1, wherein said inorganic metal compound is a silver compound selected from the group consisting of colloidal silver, silver oxide, silver phosphate, silver carbonate, silver iodate, silver pyrophosphate, silver citrate, silver tungstate and silver chloride.

4. The antibacterial resin composition according to claim 1, wherein said inorganic metal compound is a salt of a compound selected from the group consisting of alkyl, phenyl and alkylphenyl phosphates and phosphites.

5. The antibacterial resin composition according to claim 1, wherein said substrate is silica gel, activated carbon, zeolite, zirconium phosphate, or hydroxyapatite.

6. The antibacterial resin composition according to claim 1, wherein said functional group is selected from the group consisting of carboxyl group, a salt of said carboxyl group, hydroxyl group, oxazoline group, acid anhydride group, ester group, epoxy group, and amino group.

7. The antibacterial resin composition according to claim 1, wherein said functional group is selected from the group consisting of carboxyl group, a salt of said carboxyl group, acid anhydride group and epoxy group.

8. The antibacterial resin composition according to claim 7, wherein said salt of said carboxyl group is a metal salt wherein said metal is selected from the group consisting of sodium, potassium, lithium, calcium, magnesium, aluminum, zinc and tin.

9. The antibacterial resin composition according to claim 1, wherein component (C) is a montanic acid salt.

10. The antibacterial resin composition according to claim 1, wherein said component (A) is polymerized in the presence of a first part or the whole of said component (B) and thereafter, mixed with said component (C) and thereafter, mixed with a remaining part of said component (B) wherein when said component (A) is polymerized with said first part of said component (B).

11. The antibacterial resin composition of claim 1, wherein said substrate is selected from the group consisting of silica gel, activated carbon, zeolite, zirconium phosphate, hydroxyapatite and glass.

12. The antibacterial resin composition according to claim 1, wherein said aromatic alkenyl resin (A) is a polymer resin obtained by polymerizing a monomeric component, said monomeric component consisting of an aromatic alkenyl compound alone or in admixture with at least one other monomer copolymerizable therewith.

13. The antibacterial resin composition according to claim 1, wherein said aromatic alkenyl resin (A) is a graft polymer resin obtained by graft polymerizing (b) 30 to 95% by weight, based on the weight of said aromatic alkenyl resin (A), of a monomeric component consisting of an aromatic alkenyl compound alone or in admixture with at least one other monomer copolymerizable therewith in the presence of (a) 5 to 70% by weight, based on the weight of said aromatic alkenykl resin (A), of a rubbery polymer, wherein the total weight of (a) and (b) is 100%.

14. The antibacterial resin composition according to claim 1, wherein said aromatic alkenyl resin (A) is a resin blend of a thermoplastic resin obtained by polymerizing a monomeric component (b) consisting of an aromatic alkenyl compound alone or in admixture with at least one other monomer copolymerizable therewith and a graft polymer resin obtained by graft polymerizing (b) 30 to 95% by weight, based on the weight of said aromatic alkenyl resin (A), of a monomeric component consisting of an aromatic alkenyl compound alone or in admixture with at least one other monomer copolymerizable therewith in the presence of (a) 5 to 70% by weight, based on the weight of said aromatic alkenyl resin (A), of a rubbery polymer, wherein the total weight of (a) and (b) is 100%.

15. The antibacterial resin composition according to claim 1, wherein said aromatic alkenyl resin (A) is a blend of a rubbery polymer (a) and a thermoplastic resin; wherein said thermoplastic resin is obtained by polymerizing a monomeric component, said monomeric component consisting of an aromatic alkenyl compound alone or in admixture with at least one other monomer copolymerizable therewith.

16. The antibacterial resin composition of claim 13, wherein a grafting degree of said graft polymer resin is 10 to 200% by weight, based on the weight of said graft polymer resin.

17. The antibacterial resin composition of claim 11, wherein said component (B) is zeolite or zirconium phosphate which has been subjected to ion-exchange with a metal ion, wherein said metal ion is an ion of a metal selected from the group consisting of silver, copper, mercury, tin, lead, bismuth, cadmium, cobalt, nickel, iron, manganese, arsenic, antimony and barium.

18. The antibacterial resin composition of claim 17, wherein said metal ion is silver ion.

19. The antibacterial resin composition of claim 17, wherein said component (B) is zeolite which has been subjected to ion-exchange with a metal ion, wherein said metal ion is an ion of a metal selected from the group consisting of silver, copper, mercury, tin, lead, bismuth, cadmium, cobalt, nickel, iron, manganese, arsenic, antimony or barium.

20. The antibacterial resin composition of claim 19, wherein said metal ion is silver ion.

21. The antibacterial resin composition of claim 13, wherein said substrate is glass having dispersed therein silver oxide.

22. The antibacterial resin composition according to claim 13, wherein said aromatic alkenyl compound is at least one member selected from the group consisting of styrene, t-butylstyrene, α-methylstyrene, p-methylstyrene, divinylbenzene, 1,1-diphenylstyrene, N,N-diethyl-p-aminoethylstyrene, N,N-diethyl-p-aminomethylstyrene, vinylxylene, monochlorostyrene, dichlorostyrene, monobromostyrene, fluorostyrene, and ethylstyrene.

23. The antibacterial resin composition according to claim 13, wherein said other monomer is selected from the group consisting of alkenyl cyanides, acrylic acid esters, methacrylic acid esters, unsaturated acid anhydrides, α- or β-unsaturated dicarboxylic acid imide compounds, epoxy compounds, unsaturated carboxylic acid amides, amino group-containing unsaturated compounds, hydroxyl group-containing unsaturated compounds and oxazoline group-containing unsaturated compounds.

24. The antibacterial resin composition according to claim 13, wherein said rubbery polymer (a) is at least one member selected from the group consisting of polybutadiene, polyisoprene, styrene-butadiene copolymer, styrene-isoprene copolymer, acrylonitrile-butadiene copolymer, ethylene-α-olefin copolymer, ethylene-α-olefin-polyene copolymer, acrylic rubber, butadiene(meth) acrylate copolymer, styrene-butadiene block copolymer, styrene-isoprene block copolymer, hydrogenated butadiene copolymer and ethylenic ionomer.

* * * * *